(12) United States Patent
Hull

(10) Patent No.: US 7,438,500 B2
(45) Date of Patent: Oct. 21, 2008

(54) EROSION RESISTANT BARRIER WITH VARYING PERMEABILITIES

(76) Inventor: John H. Hull, 3554 Edgevale Rd., Ottawa Hills, OH (US) 43606

( * ) Notice: Subject to any disclaimer, the term of this patent is extended or adjusted under 35 U.S.C. 154(b) by 399 days.

(21) Appl. No.: 11/286,969

(22) Filed: Nov. 23, 2005

(65) Prior Publication Data

US 2007/0113756 A1 May 24, 2007

(51) Int. Cl.
*E02D 3/12* (2006.01)
(52) U.S. Cl. .................. 405/129.45; 405/129.65; 405/263; 405/264; 405/265; 405/266; 405/302.6; 252/88.1; 106/705; 106/718; 106/DIG. 1
(58) Field of Classification Search ............ 405/129.45, 405/129.65, 263, 264, 265, 266, 302.6; 252/88.1; 106/705, 718, DIG. 1
See application file for complete search history.

(56) References Cited

U.S. PATENT DOCUMENTS

| | | | | |
|---|---|---|---|---|
| 3,630,762 | A | * | 12/1971 | Olton |
| 3,948,672 | A | * | 4/1976 | Harnsberger |
| 4,344,722 | A | * | 8/1982 | Blais |
| 4,415,365 | A | | 11/1983 | Spars et al. |
| 5,464,473 | A | * | 11/1995 | Shiao |
| 5,897,946 | A | * | 4/1999 | Nachtman et al. |
| 5,915,881 | A | * | 6/1999 | Williams |
| 6,082,929 | A | * | 7/2000 | Williams |
| 6,386,796 | B1 | * | 5/2002 | Hull |
| 6,558,081 | B2 | * | 5/2003 | Hull |
| 7,011,766 | B1 | * | 3/2006 | Hull |
| 2002/0150429 | A1 | * | 10/2002 | Hull |

FOREIGN PATENT DOCUMENTS

| | | | |
|---|---|---|---|
| EP | 562969 | * | 9/1993 |
| KR | 2004057880 | * | 7/2004 |

OTHER PUBLICATIONS

Answer 27 of 141 of CA on STN "Feasibility evaluation of landfill bentonite-enhanced liners", Jian et al. Diqiu Kexue (2003), 28(5) p.568-574. China.*
Answer 45 of 141 of CA on STN Development of impervious soil liner in waste landfill using existing excavated materials. Method for mix proportion design of ESL or Eco System Liner. Higasayama et al. Obayashigumi Gijutsu Kenkyushoho (2000), 61, 71-76.*
Answer 60 of 141 of CA on STN "Influence of fines content on the behavior of compaction grout", Borden et al. Geotechnical Special Publication (1997), 66 (grouting, compaction, remediation, and testing) p.62-75.*
Answer 65 of 141 of CA on STN "Hydraulic Properties of bentonite-sand mixtures and geosynthetic clay liner in flexible and rigid wall permeameters", Eleftheriou et al., Engineering Geology and the Environment, Proceedings of the IN'tl Sypmosium on Engineering Geology and the Environment.*
Answer 83 of 141 of CA on STN "Testing of a cement bentonite mix for a low permeability plastic barrier", Deschenes et al., ASTM Special Technical Publication (1995), STP 1293 (Dredging, Remediation, and Containment of Contaminated Sediments) p.252-70.*
Answer 33 of 141 of CA on STN "Fly ash, an alternative materials for waste containment liners", Ramadas et al., Proceedings of the International Conference on Solid Waste Technology and Mgmt (2000), 16th, 296-292.*
Answer 73 of 141 of CA on STN "An early improtant applications of geosynthetics in Italy: the Seveso case-history", Cazzuffi et al., Geosynthetics: Applications, Design, and Construction, Proceedings of the European Geosynthetics Conference, 2st, Maastrict, Netherlands, Sep. 30-Oct. 2, 1996 (1996), p.579-582.*
Answer 124 of 141 of CA on STN "Rapid increases in pemeability and porosity of bentonite-sand mixtures due to alteration by water vapor" Couture, Materials Research Society Symposium Proceedings (1985), 44 (Sci Basis Nucl Waste mgmt), 515-22.*
Answer 100 of 141 of CA on STN EP 562969 Gouvenot (Sep. 29, 1993).*
Answer 122 of 141 of CA on STN: "Permeability of fly ash and fly ash-sand mixtures", Vesperman et al., ASTM Special Technical Bulletin (1985), 874(Hydraulic Barriers Soil Rock) 289-98.*
Answer 119 of 141 of CA on STN: "Bentonite Iliners for isolation of waste disposal sites", Hoeks et al., Waste Management and Research (1987), 5(2), 93-105.*
Answer 109 of 141 of CA on STN: "Seepage Control in contaminated and permeable Houston Clay: a laboratory study", Vipulanandan et al., Hazardous Waste and Hazardous Materials (1991), 17-32.*

* cited by examiner

*Primary Examiner*—Paul Marcantoni
(74) *Attorney, Agent, or Firm*—MacMillan, Sobanski & Todd, LLC

(57) ABSTRACT

The invention relates to a barrier cap material including a blend of: a plurality of aggregate particles, and a plurality of manufactured composite particles including a hydratable sealant material. In a particular embodiment, the segregation of a blend of aggregate particles and composite particles, when dropped through a water column can be controlled by varying blends of aggregate and composite particles. In another embodiment, the permeability of the barrier cap material, when hydrated on a surface, can be controlled from $1 \times 10^{-3}$ cm/sec to $1 \times 10^{-8}$ cm/sec by varying blends of aggregate and composite particles.

19 Claims, No Drawings

EROSION RESISTANT BARRIER WITH VARYING PERMEABILITIES

BACKGROUND OF THE INVENTION

The invention relates generally to materials for reducing erosion, sediment replacement and/or construction, habitat replacement and/or construction, and more particularly to a barrier cap material, which may be used for these and/or other applications.

A significant number of lakes, ponds, reservoirs, lagoons, marshes, river beds and ocean areas near coastlines are contaminated with environmentally hazardous materials. Examples of such materials include polychlorinated biphenyls, white phosphorus, synthetic organic compounds, and various metals. Many of these materials, once introduced by one means or another, settle on the bottoms of such bodies of water and become attached to sediments. The resulting contaminated sediments are detrimental to the ecosystem, especially wildlife which utilizes the body of water, such as fish, foraging waterfowl and small vertebrates and invertebrates. In some cases the contaminants are slowly released from the sediments and re-introduced into the water column. Such sediment-borne contaminants can also adversely impact wetland or deepwater ecosystems indirectly through food-chain effects.

Remedial dredging and removal of contaminated sediments is an often used approach for addressing this problem. Dredging often alters the bottom contour, sediment stability, and habitat suitability. A number of other environmental impacts may be associated with remedial dredging including re-suspension of contaminated sediments into the overlying water column and incomplete removal of sediment contaminants from the uppermost, and most biologically active layers. Consequently, remedial dredging alone may be an insufficient and incomplete solution to the problem; however, post dredging capping may address remaining concerns. Additionally, some lake and ocean coastal areas, streams and rivers, and wetland areas are inherently more susceptible to increased erosion. The erosion results in an increased suspension of sediments into the system, a geotechnically unstable condition, and a net loss of terrestrial land area. To address these problems, materials such as sand, stone, other types of replacement sediments, or erosion prevention systems may be implemented. Often these materials are not geotechnically stable and result in increased erosion, are not appropriate to sustain adequate aquatic life, or are too expensive and/or labor intensive to implement. Consequently, the use of these materials to replace dredged materials and remedy erosion may not be sufficient.

A commercial product named AQUABLOK®, sold by AquaBlok, Ltd., Toledo, Ohio, can often be used as a replacement for, or in addition to, dredging replacement material or erosion control material. The product comprises a plurality of manufactured composite particles including a hydratable sealant material. The particles are applied on a surface, such as a recently dredged underwater surface. When the particles are hydrated they replace lost volume and habitat with a geotechnically stable erosion resistant layer. Various embodiments of the AQUABLOK® product and different applications for the product are described in U.S. Pat. Nos. 5,897,946, 6,386,796 and 6,558,081, which are incorporated by reference herein.

It would be desirable to provide additional barrier cap materials that are related to the AQUABLOK® product, yet which may have more versatility and be provided at a lower cost.

SUMMARY OF THE INVENTION

The present invention relates to a barrier cap material including a blend of: a plurality of aggregate particles, and a plurality of manufactured composite particles including a hydratable sealant material.

In a particular embodiment, the segregation of a blend of aggregate particles and composite particles, when dropped through a water column can be controlled by varying blends of aggregate and composite particles.

In another embodiment, the permeability of the barrier cap material, when hydrated on a surface, can be controlled from $1 \times 10^{-3}$ cm/sec to $1 \times 10^{-8}$ cm/sec by varying blends of aggregate and composite particles.

DETAILED DESCRIPTION OF THE PREFERRED EMBODIMENTS

The barrier cap material of the invention includes a blend of a plurality of aggregate particles and a plurality of manufactured composite particles. The manufactured composite particles include a hydratable sealant material. The hydratable sealant material can be any type suitable for forming a barrier cap. Mixtures of different hydratable sealant materials can also be used. A preferred type of hydratable sealant material is a clay mineral, or a mixture of clay minerals, which exhibits a high absorption and swelling capacity upon hydration. Suitable clay minerals include, for example, bentonite, attapulgite and kaolinite. The hydratable sealant material may also include other clay sized or quasi-clay sized materials, for example, organophylic bentonite or organophylic attapulgite ("organo clay"), zeolite, inorganic oxide of aluminum, iron, and/or manganese, a humic substance, and/or activated carbon.

Materials such as clay minerals create a relatively soft barrier cap. To create a harder barrier cap, the hydratable sealant material can include a pozzolanic material alone or in combination with a material such as a clay mineral. Suitable pozzolanic materials include, for example, gypsum, gypsum fines, Portland cement, cement kiln dust, lime dust, stone dust, fly ash, and plaster of Paris.

Optionally, the hydratable sealant material can also include a binder. Some nonlimiting examples of binders which may be used include polymeric materials such as cellulosic polymers, e.g., guar gum, hydroxyethyl. cellulose and carboxymethyl cellulose. Other binders which may be used include glues, lignites, starch grafted polyacrylates, and soybean oil lecithins and their derivatives.

In a preferred embodiment, the manufactured composite particles comprise a core, and a sealant layer of the hydratable sealant material associated with the core. Preferably, the sealant layer at least partially encapsulates the core. Such manufactured composite particles are illustrated and described in more detail in the above-mentioned patents relating to the AQUABLOK® product.

Any suitable material can be used as the core. For example, the core may be formed of a piece of a material which is relatively dense and/or relatively hard compared to the hydratable sealant material. Some nonlimiting examples of materials which may be suitable include pieces of rock or stone, iron ore, slag, glass cullet, crushed glass or crushed porcelain. In some embodiments, the core is a piece of gravel or other aggregate. For some specific project applications, a less dense core (e.g., perlite) relative to the hydratable sealant material may be used, although it is preferred that the specific gravity of the composite particle, as a whole, is greater than one.

Alternatively, the core may be formed of a degradable material. Some nonlimiting examples of degradable materials which may be suitable include sand, very small stones or rocks, rubber tire chips, pelletized recycled paper, or high-density fertilizer. The degradable material can be held together by a binder if needed.

Optionally, the manufactured composite particle may include an outer coating which aids in keeping the sealant layer intact prior to application of the particle, but which disintegrates over time after application of the particle. Any suitable outer coating can be used. For example, the particle may include a thin outer coating of a polymer such as an acrylic resin or a latex.

The manufactured composite particles may optionally include other materials, for example, materials to treat contaminants, such as bacteria, algae, enzymes, neutralizing or oxidizing agents, remedial chemicals, or activated carbon. Materials to restore or improve the surrounding environment may also be included, for example, seeds and/or fertilizer.

The barrier cap material of the invention also includes a plurality of aggregate particles blended with the manufactured composite particles. As used herein, the term "aggregate particles" means rock and/or mineral particles having a particle size of at least about 0.1 inch (about 2.5 mm). The term "stone or gravel" will be considered synonymous with "rock". Particle size can be measured by any suitable method, for example ASTM Method No. D 421. This method involves passing samples of aggregate particles through a series of five sieves and measuring total particle mass retained on each sieve as well as particle mass passing through the smallest sieve. The ASTM method includes a sieve that retains particles having a particle size of 0.19 inch, which for purposes of the invention is considered to be about 0.2 inch. It is recognized that a typical sample of aggregate will contain a distribution of particle sizes, including some very small particles; preferably, at least about 80 wt % of the aggregate particles have a particle size of at least about 0.2 inch, and more preferably at least about 90 wt %. In one embodiment, at least about 80 wt % of the aggregate particles have a particle size between about 0.2 inch and about 0.5 inch.

The barrier cap material of the invention can include any blend of the aggregate particles and the manufactured composite particles that is adapted for forming a suitable barrier cap. In some embodiments, the barrier cap material comprises from about 20 wt % to about 80 wt % aggregate particles and from about 20 wt % to about 80 wt % manufactured composite particles, from about 40 wt % to about 60 wt % aggregate particles and from about 40 wt % to about 60 wt % manufactured composite particles, or about 50 wt % aggregate particles and about 50 wt % manufactured composite particles.

The blend of aggregate particles and manufactured composite particles comprises a barrier cap material that may be suitable for use in many different applications. Advantageously, the blend may be more affordable than a barrier cap material made with the manufactured composite particles alone. For example, a very affordable barrier cap material may be produced by blending the manufactured composite particles with local aggregate from the area in which the barrier cap material will be applied.

As described above, in one embodiment of the invention, the barrier cap material is applied on an underwater surface to replace sediments that have been removed and/or control erosion. It has been discovered that varying the blend of manufactured composite particles and aggregate particles can control the segregation of manufactured composite particles and aggregate particles, when dropped through a water column. As a result varying the blend of manufactured composite particles and aggregate particles can create a barrier cap with desired performance attributes such as; an armored barrier cap with a clay rich low permeability bottom layer and an aggregate rich protective upper layer, a geotechnically stable barrier cap with a aggregate rich geotechnically stable lower layer and a clay rich low permeability upper layer, an economically efficient uniformly low permeability barrier cap with a uniform blend of manufactured composite particles and aggregate particles, or a cap with targeted areas of higher permeability to serve a preferential pathway purpose, channeling contaminants to a targeted treatment surface, which can be incorporated into the blended manufacture composite particle or take the place of the aggregate particle.

The ability to control manufactured composite particle/aggregate segregation to target a specific cap function can be observed in any suitable manner. For example it can be observed by using Plexiglas settling column, having a height of 8 feet and a cross-section of 10 inches by 10 inches, which contains tap water at room temperature (~70° F.). In three separate trials a bulk 10-pound mass of a different blend of manufactured composite and aggregate, barrier cap material (#83070 manufactured composite material and AASHTO #8aggregate, #8 manufactured composite material and AASHTO#57aggregate, and #57 manufactured composite material and AASHTO #8 aggregate) is applied from just above the water surface by "dropping" the material from a square-dropping device. The descent of the particles through the water column is observed and noted. The material is then allowed to fully hydrate and two core samples are taken from the barrier cap. The core samples are then sectioned into thirds (top, middle, and bottom) and placed in a drying oven for a period of 24 hrs. The clay is then separated from the aggregate and a percentage of clay to aggregate is established for each section. The percentage trends are then used to establish a relationship of composite particle/aggregate formulation and descent.

The size of the manufactured composite particles can range from small pebbles to large size rocks or even larger. In some embodiments, the median particle size of the manufactured composite particles is within a range of from about 110% to about 150% of the median particle size of the aggregate particles. Additionally, in some embodiments, when the particle size is measured by sieving according to ASTM Method No. D 421 or a similar method, the weight percentage(s) of the manufactured composite particles in one or more of the three largest sieve fractions is within a range of from about 110% to about 150% of the corresponding weight percentage(s) of the aggregate particles.

By way of example, bulk samples of manufactured composite particles were prepared using AASHTO#57 gravel as a core, a binder, and varying weight percentages of bentonite clay as a sealant material. The formulations ranged from a bentonite-rich product (70% bentonite plus 30% gravel, referred to as "7030") to a much leaner formulation (20% bentonite plus 80% gravel, referred to as "2080"). A total of five different formulations were prepared: 7030, 5050, 4060, 3070, and 2080. The following Table 1 lists the particle size distributions of the different formulations of this example. It is recognized that different embodiments of the manufactured composite particles can be produced having particle sizes, which may vary significantly from the illustrated particle sizes.

TABLE 1

Particle Size Distributions of Manufactured Composite Particles

Portion of Bulk Sample Within Particle Size Fraction (Weight %)

| Composite Particle Formulation | <0.08 Inch Fraction | 0.08 to 0.19 Inch Fraction | 0.19 to 0.38 Inch Fraction | 0.38 to 0.75 Inch Fraction | 0.75 to 1.00 Inch Fraction | >1.00 Inch Fraction |
|---|---|---|---|---|---|---|
| 7030 | 0.3 | 0.1 | 1.9 | 31.2 | 59.0 | 7.4 |
| 5050 A | 0.6 | 0.3 | 0.8 | 66.2 | 31.7 | 0.4 |
| 5050 B | 0.2 | 0.4 | 9.0 | 65.4 | 25.0 | 0.0 |
| 4060 | 0.3 | 0.3 | 1.3 | 78.5 | 19.5 | 0.1 |
| 3070 | 0.9 | 0.3 | 2.3 | 85.2 | 11.3 | 0.0 |
| 2080 | 0.2 | 0.3 | 1.8 | 83.8 | 13.8 | 0.0 |

Typically, the density of the manufactured composite particles is somewhat less than the density of the aggregate particles. Any suitable density measurement(s) can be used, for example, wet bulk density, air-dry bulk density, and/or air-dry particle density. In some embodiments, the wet bulk density of the manufactured composite particles is within a range of from about 60% to about 90% of the wet bulk density of the aggregate particles. Following are nonlimiting examples of density ranges of the manufactured composite particles: wet bulk density between about 1.1 and about 1.7 grams per cubic centimeter; air-dry bulk density between about 60 and about 100 pounds per cubic foot; and air-dry particle density between about 1.1 and about 2.8 grams per cubic centimeter. These measurements can be done by any suitable method. The air-dry bulk density can be measured, for example, by weighing a bulk mass of particles of known (typically five-gallon) volume. The average air-dry particle density can be measured, for example, by weighing a separate subsample of air-dry particles then determining the volume of water displaced by this mass of particles (to obtain total sample volume).

The following Table 2 shows the densities of some examples of different manufactured composite particles according to the invention. It is recognized that different embodiments of the manufactured composite particles can be produced having densities which may vary significantly from the illustrated densities.

TABLE 2

Densities of Manufactured Composite Particles

| Composite Particle Formulation | Average Wet Bulk Density (g/cc) | Average Air-Dry Bulk Density (lbs/ft$^3$) |
|---|---|---|
| 7030 | 1.23 | 78.3 |
| 5050 | 1.32 | 76.0 |
| 2080 | 1.53 | 85.8 |

It has also been discovered that a barrier cap material can be produced in which the blend of aggregate particles and manufactured composite particles forms an underwater barrier cap that is very impermeable to water and erosion resistant. The low water permeability prevents contaminants in an underwater surface from moving by advection into the overlying water column. While the barrier cap material can be used in many different applications, it is anticipated that the material may be particularly preferred for use in forming an underwater barrier cap after dredging of the underwater surface to replace dredged material and minimize diffusion of any residual contaminants into the water column.

The water impermeability of the barrier cap material may be as good as, or almost as good as, the water impermeability of a barrier cap formed with the manufactured composite particles alone. Preferably, the barrier cap material, when hydrated on a surface, forms a barrier cap or barrier layer on the surface having a water permeability of less than $1 \times 10^{-7}$ cm/sec. under a minimum hydraulic gradient of 1 cm/cm according to ASTM Method A 5084.

The composite particle/aggregate formulation can be altered in such a way as to promote lower permeability in targeted areas of the cap creating a preferential pathway or a "gate" as envisioned in a "funnel and gate" system or known as a "permeable reactive barrier" in the practice of remediation. This would allow targeted areas of treatment throughout the cap. For example; to treat arsenic contamination, aggregate particles could be substituted with Iron slag particles smaller than the composite particles creating areas of lower permeability along the Iron particles increasing the contact of the treatment to the contamination. Preferably, the barrier cap material, when hydrated on a surface, forms a barrier cap or barrier layer on the surface having a water permeability greater than $1 \times 10^{-6}$ under a minimum hydraulic gradient of 1 cm/cm according to ASTM Method D 5084 to promote an increased rate of treatment and eliminate the potential for redirection of contamination to a more preferential less desirable pathway.

The addition of bentonite to a sediment or barrier layer can significantly reduce erosion rates related to conventional sand, gravel or topsoil placement. Studies have shown that the addition of as little as two percent bentonite to sand or topsoil will reduce erosion rates by one to two orders of magnitude (Lick, W., Effects of Bentonite Clay on Sediment Erosion Rates, April 2001 and; Month 6 Data Report for SITE Demonstration of the AquaBlok™ Sediment Capping Technology at the Anacostia River, Washington, D.C., October 2005). To further increase erosion resistance, the addition of a pozzolanic material alone or in combination with a material such as a clay mineral can be added to the cap. Suitable pozzolanic materials include, for example, gypsum, gypsum fines, Portland cement, cement kiln dust, lime dust, stone dust, fly ash, and plaster of Paris.

The principle and mode of operation of this invention have been described in its preferred embodiments. However, it should be noted that this invention may be practiced otherwise than as specifically illustrated and described without departing from its scope.

What is claimed is:

1. A barrier cap material comprising a blend of:
   a plurality of aggregate particles having a particle size between about 0.1 inch and about 2 inches; and a plurality of manufactured composite particles including a core and a hydratable sealant material attached to the core;

the barrier cap material including the aggregate particles in an amount from about 20% to about 80% and the manufactured particles in an amount from about 20% to about 80% by weight of the barrier cap material.

2. The barrier cap material according to claim 1 wherein the median particle size of the manufactured composite particles is within a range of from about 50% to about 150% of the median particle size of the aggregate particles.

3. The barrier cap material according to claim 1 wherein the wet bulk density of the manufactured composite particles is within a range of from about 60% to about 90% of the wet bulk density of the aggregate particles.

4. The barrier cap material according to claim 1 wherein the manufactured composite particles are generally spherical in shape and a substantial portion of the aggregate particles are also generally spherical in shape.

5. The barrier cap material according to claim 1 which comprises from about 40 wt % to about 60 wt % aggregate particles and from about 40 wt % to about 60 wt % manufactured composite particles.

6. The barrier cap material according to claim 1 wherein at least about 80 wt % of the aggregate particles have a particle size of at least about 0.2 inch.

7. The barrier cap material according to claim 1 wherein the aggregate particles comprise gravel.

8. The barrier cap material according to claim 1 wherein the hydratable sealant material is in a layer at least partially encapsulating the core.

9. The barrier cap material according to claim 1 wherein the manufactured composite particles have a specific gravity greater than one.

10. The barrier cap material according to claim 1 wherein the hydratable sealant material comprises at least one clay mineral.

11. The barrier cap material according to claim 1 wherein the manufactured composite particles have an average wet bulk density between about 1.1 and about 1.7 grams per cubic centimeter.

12. A barrier cap material comprising a blend of:
a plurality of aggregate particles having a particle size between about 0.1 inch and about 2 inches; and
a plurality of manufactured composite particles including a core and a hydratable sealant material attached to the core;
the blend, when dropped through a water column, having a uniform descent such that the blend does not segregate as it drops;
the barrier cap material including the aggregate particles in an amount from about 20% to about 80% and the manufactured particles in an amount from about 20% to about 80% by weight of the barrier cap material.

13. A barrier cap material comprising a blend of:
a plurality of aggregate particles having a particle size between about 0.1 inch and about 2 inches; and
a plurality of manufactured composite particles including a core and a hydratable sealant material attached to the core;
the blend, when dropped through a water column, having a non-uniform descent such that the composite particles descend at a faster rate than the aggregate particles creating an aggregate rich armored upper layer;
the barrier cap material including the aggregate particles in an amount from about 20% to about 80% and the manufactured particles in an amount from about 20% to about 80% by weight of the barrier cap material.

14. A barrier cap material comprising a blend of:
a plurality of aggregate particles having a particle size between about 0.1 inch and about 2 inches; and
a plurality of manufactured composite particles including a core and a hydratable sealant material attached to the core;
the blend, when dropped through a water column, having a non-uniform descent such that the composite particles descend at a slower rate than the aggregate particles creating an aggregate rich geotechnically stable lower layer;
the barrier cap material including the aggregate particles in an amount from about 20% to about 80% and the manufactured particles in an amount from about 20% to about 80% by weight of the barrier cap material.

15. A barrier cap material comprising a blend of:
a plurality of aggregate particles having a particle size between about 0.1 inch and about 2 inches; and
a plurality of manufactured composite particles including a core and a hydratable sealant material attached to the core;
the barrier cap material, when hydrated on a surface, forming a barrier layer on the surface having a water permeability of less than $1 \times 10^{-7}$ cm/sec;
the barrier cap material including the aggregate particles in an amount from about 20% to about 80% and the manufactured particles in an amount from about 20% to about 80% by weight of the barrier cap material.

16. A barrier cap material comprising a blend of:
a plurality of aggregate particles having a particle size between about 0.1 inch and about 2 inches; and
a plurality of manufactured composite particles including a core and a hydratable sealant material attached to the core;
the barrier cap material, when hydrated on a surface, forming a barrier layer on the surface having a water permeability of greater than $1 \times 10^{-6}$ cm/sec;
the barrier cap material including the aggregate particles in an amount from about 20% to about 80% and the manufactured particles in an amount from about 20% to about 80% by weight of the barrier cap material.

17. A barrier cap material comprising a blend of:
a plurality of aggregate particles having a particle size between about 0.1 inch and about 2 inches; and
a plurality of manufactured composite particles including a core and a hydratable sealant material attached to the core and amendments to facilitate chemical and/or biological treatment of contaminants;
the barrier cap material, when hydrated on a surface, forming a layer on the surface including areas of lower permeability and areas of higher permeability creating a funnel and gate system;
the barrier cap material including the aggregate particles in an amount from about 20% to about 80% and the manufactured particles in an amount from about 20% to about 80% by weight of the barrier cap material.

18. A barrier cap material comprising a blend of:
a plurality of aggregate particles having a particle size between about 0.1 inch and about 2 inches; and
a plurality of manufactured composite particles including a core and a hydratable sealant material attached to the core;
the barrier cap material, when hydrated on a surface, forming an erosion resistant layer on the surface;

the barrier cap material including the aggregate particles in an amount from about 20% to about 80% and the manufactured particles in an amount from about 20% to about 80% by weight of the barrier cap material.

19. A barrier cap material comprising alternating layers of:

aggregate particles having a particle size between about 0.1 inch and about 2 inches; and manufactured composite particles including a core and a hydratable sealant material attached to the core;

the hydratable sealant material, when hydrated on a surface, infiltrating the aggregate particles creating a uniform barrier layer having a water permeability of less than $1 \times 10^{-7}$ cm/sec;

the barrier cap material including the aggregate particles in an amount from about 20% to about 80% and the manufactured particles in an amount from about 20% to about 80% by weight of the barrier cap material.

* * * * *